United States Patent [19]

Cohen

[11] Patent Number: 4,626,198
[45] Date of Patent: Dec. 2, 1986

[54] METHOD AND APPARATUS FOR PRODUCING DEAD BURNT MATERIALS

[75] Inventor: Sidney M. Cohen, Allentown, Pa.

[73] Assignee: Fuller Company, Bethlehem, Pa.

[21] Appl. No.: 778,466

[22] Filed: Sep. 20, 1985

[51] Int. Cl.$^4$ .................. F27B 14/00; F27B 7/02; C04B 35/00; C04B 35/02

[52] U.S. Cl. ................... 432/13; 432/106; 501/1; 501/94; 501/108; 501/113

[58] Field of Search .............. 432/13, 95, 106; 264/113; 501/108, 113, 118, 122, 1, 94; 106/100

[56] References Cited

U.S. PATENT DOCUMENTS 1,912,894 6/1933 Garnett ........................ 501/109
3,304,188 2/1967 Hughey ........................ 501/121

Primary Examiner—John J. Camby
Attorney, Agent, or Firm—Frank H. Thomson

[57] ABSTRACT

An improved process and apparatus for producing sintered material such as dead burned clay, dolomite, magnesite or periclase with the highest particle specific gravity capable from each material. A grinding mill produces raw material which is 100% minus 20 mesh. The ground raw material is supplied to a suspension type preheater and then to a stationary flash calcining system where the material is soft burned at temperatures in the range of 1000° to 1200° C. From the calcining system, the calcined material is immediately supplied to hot briquetting machine where briquettes or nodules are formed. The hot nodules at a temperature of approximately 800° C. are then immediately supplied to a rotary kiln which serves as a sintering furnace where the soft burned material is dead burnt at a temperature in the range of 1650° to 1850° C. Hot spent combustion gas from the sintering furnace is supplied to the calcining furnace to serve as preheated secondary air for combustion. The spent hot gas from the calcining furnace is used in the suspension preheater to preheat the raw material.

14 Claims, 1 Drawing Figure

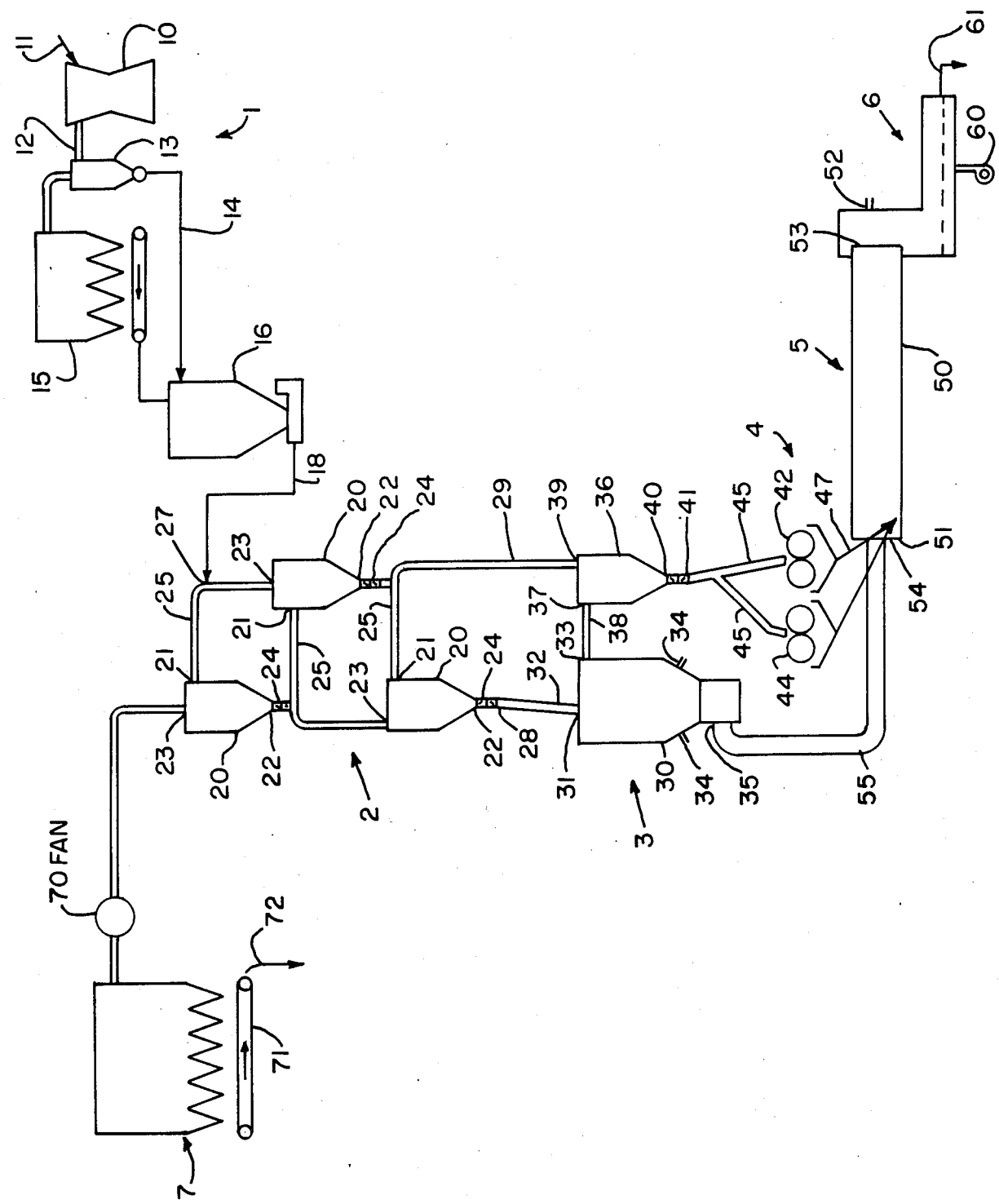

METHOD AND APPARATUS FOR PRODUCING DEAD BURNT MATERIALS

BACKGROUND OF THE INVENTION

This invention relates to a method and apparatus for the manufacture of dead burnt materials such as clay, dolomite, magnesite or periclase to produce the highest particle specific gravity from each in a selected size range. More particularly, the present invention relates to an energy efficient improved method and apparatus for producing refractory grade dead burnt materials which utilizes a continuous process including a suspension-type preheater, a flash or suspension-type calcining system, a hot briquetting machine and a rotary sintering machine.

Prior to the present invention, it was known to produce dead burnt materials such as dolomite including the step of soft burning the raw material in a furnace such as a shaft furnace or rotary kiln at a temperature in the range of 1000° to 1200° C. Subsequent to the soft burning of the material, it is common practice to slake or hydrate the material by the addition of water to form hydroxide. Thereafter, the hydroxide may be formed into pellets or nodules in order to aid densification and then dead burned at a temperature on the order of 1300° to 1800° C. to sinter the material to produce the desired refractory grade specific gravity product. There may be a period of storage between the formation of pellets and the final sintering refractory grade materials. Typical of such processes are U.S. Pat. Nos. 1,912,894; 3,304,188; 3,698,922; and 3,736,161.

In such prior processes, typical fuel consumption is on the order of 12 to $14 \times 10^6$ BTU's per ton of end product. It would be useful to be able to produce a similar product having a reduced fuel consumption while maintaining product quality.

SUMMARY

It is therefore the principal object of this invention to provide an improved energy efficient process and apparatus for producing refractory grate dead burnt materials such as clay, dolomite, magnesite or periclase which reduces overall fuel consumption.

In general, the foregoing and other objects will be carried out by providing an improved process for producing sintered materials such as dead burnt clay, dolomite, magnesite or periclase comprising the steps of calcining raw materials while in suspension in a calcining furnace at a temperature in the range of approximately 1000° to 1200° C.; forming the calcined materials into nodules and supplying the thus formed nodules to a sintering furnace; and sintering the nodules at a temperature in the range of approximately 1650° to 1850° C.

The objects of the present invention will also be carried out by providing apparatus for producing dead burnt materials such as clay, dolomite, magnesite or periclase comprising a stationary calcining furnace having an inlet for raw material to be sintered, an inlet for fuel for combustion therein, an inlet for gas for combustion and an outlet for spent combustion gas and entrained calcined materials; a gas-solid separator having an inlet for spent combustion gas and entrained calcined material flow connected to the outlet of the calcining furnace, an outlet for spent combustion gas and an outlet for calcined material; means for forming said hot calcined material into nodules having and inlet flow connected to the outlet for calcined material of said gas-solid separator and an outlet for nodules for calcined material whereby the calcined material is nodulized while at a high temperature; and a sintering furnace having an inlet for fuel, an inlet for air for combustion, an inlet for nodules of calcined material, an outlet for dead burnt material and an outlet for combustion gas.

The invention also includes the use of a grinding system for grinding the raw material to a fine powder such as 100% minus 20 mesh. The material is then supplied to a suspension type preheater including a plurality of serially connected cyclone separators which utilize spent combustion gas discharged from a calcining furnace to preheat the material. A stationary calcining furnace or flash calciner is employed which includes burning fuel within the calciner for soft burning the raw material. The soft burned material is then supplied to a hot briquetting machine where nodules or briquettes are produced for supply to the sintering furnace in a dense state. In the preferred form the sintering furnace is a rotary kiln but it is to be understood that a shaft kiln or other furnace could be used. In the rotary kiln, the material is dead burnt at a temperature in excess of 1650° C. Material discharged from the sintering furnace can be cooled by ambient air in any suitable cooler such as a grate type or rotary cooler. Spent combustion gas from the sintering furnace is supplied as preheated secondary air for combustion to the flash calciner. The final product will have a bulk specific density above 3.2. The final sintered densified briquette is crushed and sized for use as a refractory grade material.

BRIEF DESCRIPTION OF THE DRAWING

The invention will be described in connection with the annexed drawing wherein the single FIGURE is a diagrammatic view of the apparatus according to the present invention for carrying out the process of the present invention.

DESCRIPTION OF THE PREFERRED EMBODIMENT

Referring to the drawing, the invention is shown, including a grinding system generally indicated at 1, a suspension preheater generally indicated at 2, a flash calcining system or apparatus for producing a soft burned material 3, an apparatus 4 for forming the calcined material into dense nodules, a sintering furnace 5 and a cooling apparatus 6. Exhaust gases may be filtered through a high efficiency dust collector system generally indicated at 7.

The grinding system 1 may include a roller mill 10 or other suitable grinding apparatus such as a ball mill. The mill 10 includes an inlet 11 for raw material to be ground. Since the mill illustrated is an air swept ball mill, the grinding system will include an outlet 12 for air and ground material connected to a cyclone 13 with an outlet for ground material 14 and a high efficiency dust collector 15, each of which supplies material to a storage vessel 16 in a manner generally known per se. With the grinding system 1, the raw material is ground to 100 percent minus twenty mesh.

The suspension preheater 2 is a suspension preheater of the type used in the cement industry but heretofore unknown in the process of producing refractory grade dead burnt materials. The preheater includes a plurality of serially connected gas solids separators or cyclones each indicated at 20. The cyclones each include an inlet 21 for gas and suspended or entrained raw material, an outlet 22 for separated solid material and an outlet 23 for separated gas. Air locks or double tipping gates 24 may be included at the material outlet 22. A suitable duct 25 flow connects the gas outlet 23 of a lower cyclone 20 with the gas and material inlet 21 of an upper adjcent cyclone. The material outlets 23 of an upper cyclone are connected to the duct 25 of a lower cyclone so that material discharged from the upper cyclone is entrained in the hot gases discharged from a lower cyclone and heated thereby. The preheater 2 includes a raw material inlet 27 which is connected by conduit 18 with storage vessel 16 for supplying ground material on the order of 100% minus 20 mesh to the preheater 2 and burning system.

The burning system according to the present invention includes the calcining furnace 3 which includes a stationary vessel 30 having an inlet 31 for raw material to be calcined which is flow connected by conduit 32 to the outlet 28 of the suspension preheater 2. The vessel further includes an outlet 33 for spent combustion gas and entrained calcined material, an inlet 34 defined by burners for fuel for combustion within the vessel 30, an inlet 35 for gas for combustion. The configuration of the calcining furnace per se is similar to that used in the cement industry.

A gas-solids separator 36 has an inlet 37 for gas and entrained solids flow connected by conduit 38 to the outlet 33 for spent combustion gas and calcined material of the calcining vessel 30. The gas solids separator also includes an outlet 39 for separated gas flow connected by a conduit 29 to the suspension preheater 2 to supply hot gas to the preheater for preheating the raw material. A gas solid separator 36 also includes an outlet 40 for separated calcined material. Air locks 41 may be included at the outlet 40.

Combustion takes place within the vessel 30 to maintain temperatures in the range of approximately 1000° to 1200° C. to soft burn the material within the vessel 30 while the material is in suspension within the furnace 3. The calcined material is discharged through outlet 40 at a temperature of approximately 1000° C. while hot gases are discharged through outlet 39 at a temperature of approximately 1200° C.

Calcined material is supplied from outlet 40 to the means 4 for forming the calcined material into nodules. This is a hot material briquetting machine. In the embodiment shown, there are two briquetting machines 42 and 44 shown with one being a back-up or if desired for high capacity, to be utilized together in a single application. Each briquetting machine 4 include an inlet 45 for calcined material which is flow connected to the outlet 40 for calcined material of the gas solids separator 36. Each briquetting machine also includes an outlet 47 for nodules.

In the embodiment illustrated, the sintering furnace 5 is a rotary kiln 50 having an inlet 51 for nodules of calcined material, an inlet or burner 52 for fuel for combustion within the sintering furnace, an inlet 53 for air for combustion which also serves as an outlet for dead burnt material and an outlet 54 for spent combustion gas.

A duct 55 flow connects the outlet for spent combustion gas of the sintering furnace 5 to the inlet 35 for gas for combustion of the calcining furnace 3. Typically, the calcined material will be burned in the sintering furnace at temperatures in the range of approximately 1650° to 1850° C.

The apparatus also includes a cooler generally indicated at 6 which may be of any suitable type such as a reciprocating grate cooler and include means 60 for supplying cool air to the cooler 6. The cooler also includes an inlet for hot material flow connected to the outlet 53 for dead burnt material and an outlet 61 for cooled material. During the cooling phase, there is direct contact between the hot material and the cool ambient air whereby the material is cooled and the cooling air is heated. The thus heated cooling air is supplied as a secondary air for combustion to the sintering furnace 5. While not illustrated, some of the cooling air may be supplied through a separate duct directly to the inlet 35 for combustion air for the calcining furnace 3. In the embodiment illustrated, primary combustion air is supplied from ambient air and there is adequate excess oxygen in the exhaust gas from kiln 5 to be used in calciner 4. The final densified, cooled briquette discharged at 61 is taken for crushing and sizing for end use in refractories.

According to the present invention, fuel savings are realized by the more efficient soft burning of the feed material wherein it is believed that fuel consumption on the order of 3 to $5 \times 10^6$ BTU per ton can be achieved compared to prior practice where fuel consumption figures on the order of 7 to $8 \times 10^6$ BTU per ton are commonplace for soft burning the material. The fuel savings are accomplished by the supply of preheated air for combustion from the kiln through duct 55 to the calcining furnace. It is also believed that fuel savings in the sintering furnace will be accomplished because of the direct supply of hot calcined nodules from the briquetting machine 42 and 44 to the kiln. Rather than starting with cool feed material, the feed material utilized in the present invention will have a temperature on the order of 800° C.

From the foregoing it should be apparent that the objects of the invention have been carried out. By the present invention, the spent combustion gas from the calcining furnace is used to preheat the raw feed material. Fuel savings are realized in the calcining system by utilizing the spent combustion gas from the sintering furnace in the calcining furnace. The calcined material is immediately supplied to a briquetting machine and from the briquetting machine, the hot briquettes or nodules are immediately supplied to the sintering furnace so that there is reduced fuel consumption by utilizing hot material in the sintering furnace.

The system includes a fan means 70 for inducing a draft on the preheater and calciner system as well as through the sintering furnace and the high efficiency dust collector 7 including conveyor 71 for discharging collected dust at 72 which may be returned to the system.

It is intended that the foregoing be a description of a preferred embodimentand that the invention be limited solely by that which is within the scope of the appended claims.

I claim:

1. An improved process for producing sintered materials such as dead burnt clay, dolomite, magnesite or periclase with a desired particle specific gravity comprising the steps of calcining raw materials while in suspension in a calcining furnace at a temperature in the range of approximately 1000° to 1200° C.; forming the calcined materials into nodules; supplying the thus formed nodules to a sintering furnace; and sintering the nodules at a temperature in the range of approximately 1650° to 1850° C.

2. An improved process of producing sintered materials according to claim 1 further comprising the step of supplying exhaust gases from the sintering furnace to the calcining furnace.

3. An improved process of producing sintered materials according to claim 2 further comprising the step of preheating the raw materials while in suspension in exhaust gases discharged from the calcining furnace.

4. An improved process of producing sintered materials according to claim 1 wherein the step of forming the calcined material into nodules is performed substantially immediately after the raw material is calcined.

5. An improved process or producing sintered materials according to claim 4 wherein the step of supplying the nodules to a sintered furnace is performed substantially immediately after the nodules are formed whereby the nodules are at a temperature of approximately 800° C.

6. An improved process of producing sintered material according to claim 5 further comprising the step of cooling the sintered material by direct contact with cooling air.

7. A process of producing sintered materials according to claim 6 further comprising the step of grinding the raw material to 100% minus 20 mesh.

8. Apparatus for producing dead burnt materials such as dolomite, magnesite or periclase comprising:
 a stationary calcining furnace having an inlet for raw material to be sintered, an inlet for fuel for combustion therein, an inlet for gas for combustion, and an outlet for spent combustion gas and entrained calcined material;
 a gas-solids separator having an inlet for spent combustion gas and entrained calcined material flow connected to the outlet of the calcining furnace, an outlet for spent combustion gas and an outlet for calcined material;
 means for forming said calcined material into nodules having an inlet flow connected to the outlet for calcined material of said gas-solids separator and an outlet for nodules of calcined material whereby the calcined material is nodulized while at a high temperature; and
 a sintering furnace having an inlet for fuel, an inlet for air for combustion, an inlet for nodules of calcined material flow connected to the outlet for nodules of said last named means, an outlet for dead burnt material and an outlet for combustion gas.

9. Apparatus for producing dead burnt materials according to claim 8 further comprising duct means flow connecting the outlet for combustion gas of the sintering furnace to the inlet for gas for combustion of the calcining furnace.

10. Apparatus for producing dead burnt materials according to claim 9 further comprising preheater means having an inlet for fine ground raw material and an inlet for hot gases flow connected to the outlet for spent combustion gas of said gas-solids separator and an outlet for preheated raw material whereby the raw material and hot gases are in countercurrent contact with each other to thereby preheat the raw material and said outlet for preheated raw material is flow connected to the inlet for raw material of the calcining furnace.

11. Apparatus for producing dead burnt materials according claim 10 further comprising a cooler flow connected to the outlet for dead burnt material of the sintering furnace including means for supplying cooling air for direct heat exchange contact with hot dead burned material whereby the dead burnt material is cooled and the cooling air is heated and means for supplying at least some of the thus heated cooling air to the inlet for air for combustion of the sintering furnace.

12. Apparatus for producing dead burnt materials according to claim 11 further comprising means for grinding the raw material to 100% minus 20 mesh.

13. Apparatus for producing dead burnt materials according to claim 12 wherein said means for forming the calcined material into nodules is a hot briquetting machine.

14. An improved process for producing sintered material comprising the steps of calcining raw materials to be sintered in a calcining furnace; immediately forming the hot calcined materials into nodules; immediately supplying the thus formed nodules to a sintering furnace; and sintering the nodules.

* * * * *